(12) United States Patent
Suzuki

(10) Patent No.: US 9,174,667 B2
(45) Date of Patent: Nov. 3, 2015

(54) ELECTRIC POWER STEERING

(75) Inventor: Hiroshi Suzuki, Okazaki (JP)

(73) Assignee: JTEKT CORPORATION, Osaka (JP)

( * ) Notice: Subject to any disclaimer, the term of this patent is extended or adjusted under 35 U.S.C. 154(b) by 210 days.

(21) Appl. No.: 13/879,834

(22) PCT Filed: Oct. 17, 2011

(86) PCT No.: PCT/IB2011/002449
§ 371 (c)(1),
(2), (4) Date: Apr. 17, 2013

(87) PCT Pub. No.: WO2012/052817
PCT Pub. Date: Apr. 26, 2012

(65) Prior Publication Data
US 2013/0220727 A1    Aug. 29, 2013

(30) Foreign Application Priority Data

Oct. 18, 2010 (JP) .................... 2010-233197

(51) Int. Cl.
| | |
|---|---|
| *B62D 5/04* | (2006.01) |
| *H02P 25/22* | (2006.01) |
| *H02P 29/02* | (2006.01) |
| *H02P 5/747* | (2006.01) |

(52) U.S. Cl.
CPC ............... *B62D 5/04* (2013.01); *B62D 5/0403* (2013.01); *B62D 5/046* (2013.01); *B62D 5/0484* (2013.01); *H02P 5/747* (2013.01); *H02P 25/22* (2013.01); *H02P 29/022* (2013.01)

(58) Field of Classification Search
CPC ........ B62D 5/04; B62D 5/0421; B62D 5/046; B62D 5/0463; B62D 5/0475; B62D 6/00

USPC .................................. 180/443, 444, 446
See application file for complete search history.

(56) References Cited

U.S. PATENT DOCUMENTS

| | | | |
|---|---|---|---|
| 6,158,553 A | | 12/2000 | Oshima et al. |
| 7,392,879 B2* | | 7/2008 | Imagawa et al. ............. 180/444 |
| 7,782,000 B2* | | 8/2010 | Suzuki .......................... 318/434 |
| 8,421,388 B2* | | 4/2013 | Mukai ...................... 318/400.21 |

(Continued)

FOREIGN PATENT DOCUMENTS

| | | |
|---|---|---|
| CN | 100497064 C | 6/2009 |
| DE | 101 59 704 A1 | 8/2002 |

(Continued)

OTHER PUBLICATIONS

International Search Report issued in International Patent Application No. PCT/IB2011/002449 dated Feb. 24, 2012.

(Continued)

*Primary Examiner* — Joseph Rocca
*Assistant Examiner* — Marc A Scharich
(74) *Attorney, Agent, or Firm* — Oliff PLC

(57) ABSTRACT

A steering force assisting device that includes an electric motor and includes independent two sets of motor driving circuit and control unit, and the electric motor includes coils having the same polarity and different motor characteristics, the coils being wound around each of teeth of a stator of the electric motor. The motor characteristics are a high speed/low torque characteristic and a low speed/high torque characteristic, and may be selected on the basis of the running condition of a vehicle.

3 Claims, 12 Drawing Sheets

(56) References Cited

U.S. PATENT DOCUMENTS

| | | | |
|---|---|---|---|
| 2002/0011811 A1* | 1/2002 | Chen et al. ............... | 318/254 |
| 2004/0007416 A1 | 1/2004 | Furumi et al. | |
| 2006/0071628 A1* | 4/2006 | Ta et al. ............... | 318/807 |
| 2006/0219470 A1 | 10/2006 | Imagawa et al. | |
| 2008/0067960 A1* | 3/2008 | Maeda et al. ............ | 318/400.02 |

FOREIGN PATENT DOCUMENTS

| | | |
|---|---|---|
| DE | 10 2005 044 875 A1 | 10/2006 |
| EP | 1 375 300 A2 | 1/2004 |
| EP | 1 426 266 A2 | 6/2004 |
| JP | A-2000-004600 | 1/2000 |
| JP | A-2005-247214 | 9/2005 |
| JP | A-2008-68769 | 3/2008 |
| JP | A-2006-273153 | 10/2008 |
| JP | A-2010-178596 | 8/2010 |

OTHER PUBLICATIONS

Written Opinion of the International Searching Authority issued in International Patent Application No. PCT/IB2011/002449 dated Feb. 24, 2012.

Jun. 9, 2014 Japanese Office Action issued in Japanese Application No. 2010-233197 (with partial translation).

Dec. 31, 2014 Office Action issued in Chinese Application No. 201180049504.7.

* cited by examiner

FIRST LINE SYSTEM CHARACTERISTIC
(LOW SPEED/HIGH TORQUE MODE)

SECOND LINE SYSTEM CHARACTERISTIC
(HIGH SPEED/LOW TORQUE MODE)

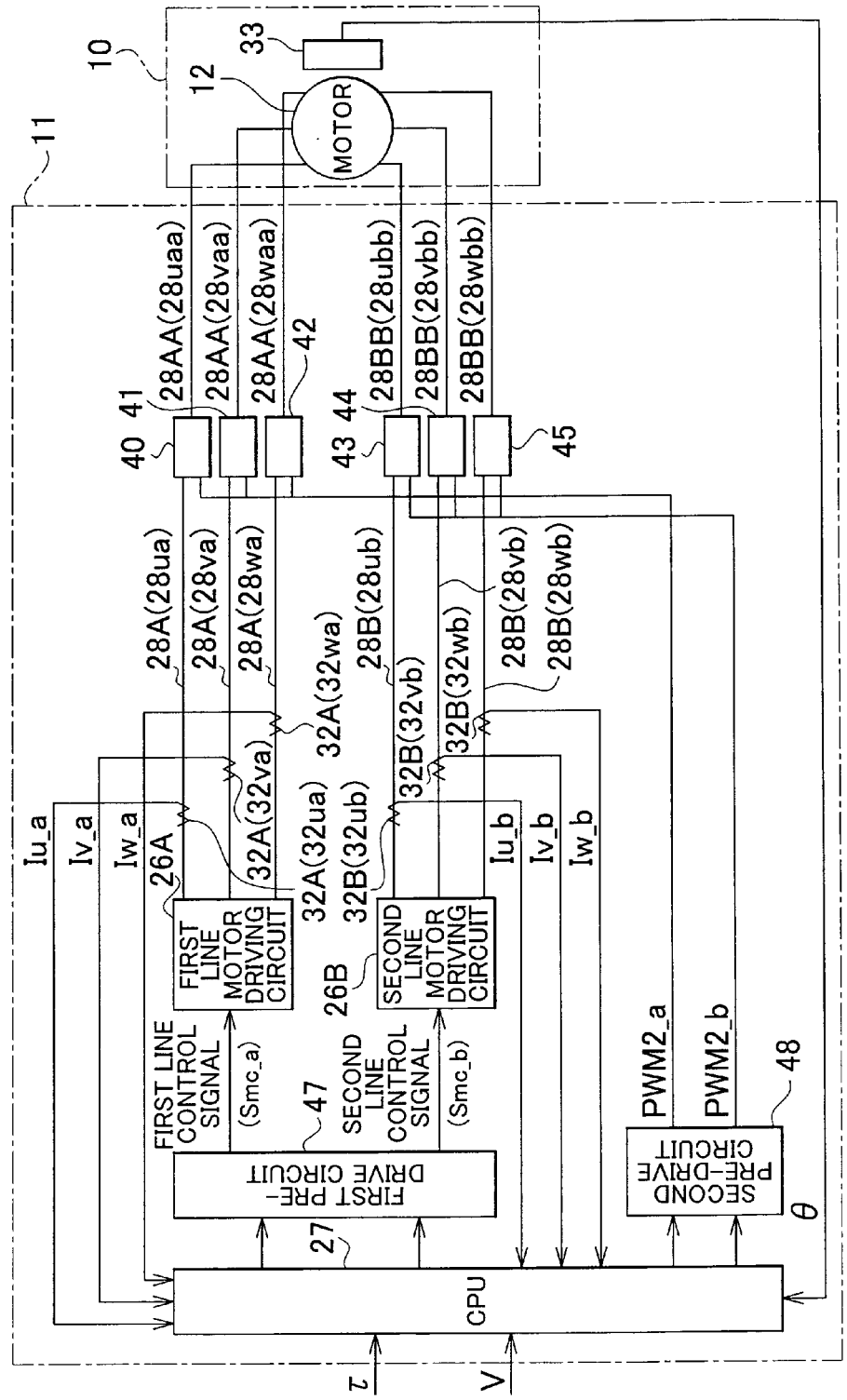

F I G . 5
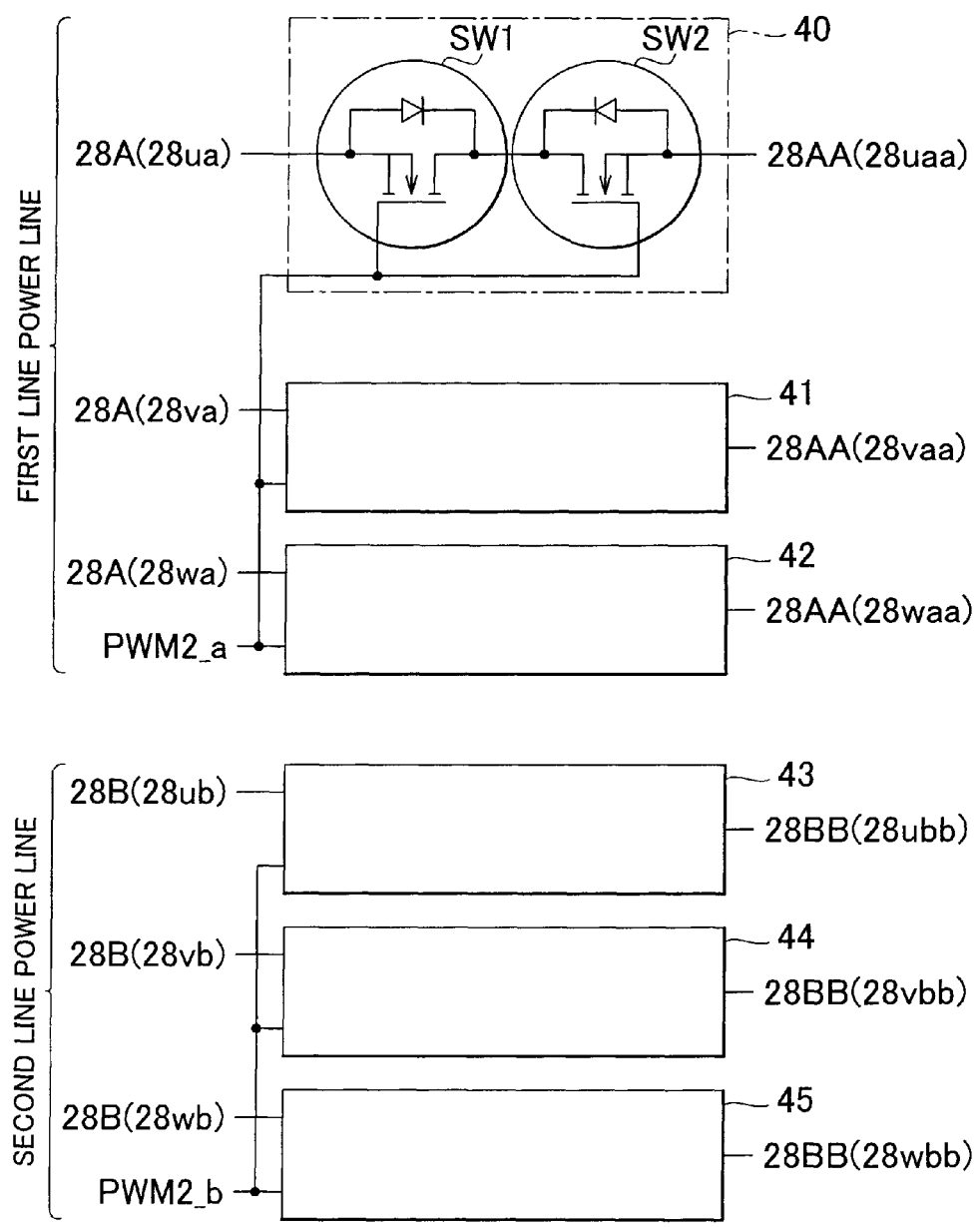

ELECTRIC POWER STEERING

BACKGROUND OF THE INVENTION

1. Field of the Invention

The invention relates to an electric power steering.

2. Description of Related Art

In an existing art, an electric power steering (EPS) controls an electric motor so that steering assist force has an assist characteristic based on the running condition of a vehicle.

For example, a method of controlling the electric motor includes field-weakening control. Field-weakening control is executed only when the vehicle speed is lower than a predetermined value, and is not executed when the vehicle speed is higher than or equal to the predetermined value (for example, see Japanese Patent Application Publication No. 2008-068769 (JP-A-2008-068769)). By so doing, the linearity of the motor characteristic is maintained against steering during running of the vehicle, and motor output according to a command value may be obtained. Therefore, a steering feeling during running improves. On the other hand, field-weakening control works when the vehicle is stopped or the vehicle is running at a low speed and, as a result, required torque may be obtained, so it is possible to ensure appropriate assist force.

In another related art, two electric motors having different output characteristics are arranged at different portions of a steering system from a steering wheel of a vehicle to steered wheels, and the electric motors each are individually controlled on the basis of the running condition of the vehicle to thereby, for example, assist in steering only with the low-power electric motor during running at a high speed and assist in steering only with the high-power electric motor during running at a relatively low speed (for example, see Japanese Patent Application Publication No. 2005-247214 (JP-A-2005-247214)). By so doing, it is possible to easily control steering assist force on the basis of the running condition of the vehicle.

However, as in the case of the above related examples, when the output characteristic of a single electric motor is frequently varied on the basis of the running condition of a vehicle, components may be degraded because of heat and vibrations of the motor due to a steep torque variation to thereby lead to a decrease in the reliability of the system, and, in some cases, it is conceivable that a steering feeling deteriorates. In addition, because a single electric motor is controlled, there is a problem that, when there occurs poor energization in any one of the phases (any one of U, V and W phases) of the electric motor due to a break in a power supply line, a contact failure of a driving circuit, or the like, the system should be immediately stopped.

On the other hand, when two electric motors having different output characteristics are arranged at different portions of a steering system from a steering wheel of a vehicle to steered wheels, the portions at which the two electric motors are installed are different, so a steering feeling may include a feeling of strangeness at the time of changing between the two electric motors. Other than the above, space for installing the two electric motors is required, so the flexibility of installation problematically reduces. Thus, there is still room for improvement in the above points.

SUMMARY OF THE INVENTION

The invention provides an electric power steering that maintains the reliability of a system and that gives an appropriate steering feeling according to the running condition of a vehicle.

An aspect of the invention relates to an electric power steering. The electric power steering includes: a steering force assisting device that applies assist force to a steering system and that has an electric motor that generates the assist force; a motor driving circuit that drives the electric motor; and a control unit that controls the motor driving circuit, wherein the electric motor includes a rotor having a magnet and a stator having teeth around each of which a coil is wound, the steering force assisting device includes at least two independent sets of the motor driving circuit and the control unit, the electric motor has coils having the same polarity and different motor characteristics on the stator, the number of the coils being equal to the number of the sets of motor driving circuit and control unit, and the coils are respectively connected to the different sets of motor driving circuit and control unit.

With the above configuration, the at least two coils that are provided for the stator of the electric motor and that have the same polarity and different characteristics may be respectively controlled by the same number of independent sets of the motor driving circuit and the control unit. As a result, the reliability of the system may be maintained, and an appropriate steering feeling in response to the running condition of the vehicle may be obtained.

In the above aspect, the motor characteristics may be a high speed/low torque characteristic and a low speed/high torque characteristic.

With the above configuration, the motor characteristic may be set to a high speed/low torque characteristic or a low speed/high torque characteristic. As a result, each electric motor may be controlled in accordance with the motor characteristic in response to the running condition of the vehicle, so an appropriate steering feeling may be obtained. That is, when the vehicle speed is medium or high and a high number of revolutions of the motor is required (for example, at the time of emergency steering), the electric motor is controlled in accordance with the high speed/low torque characteristic; while, when the vehicle speed is low or the vehicle is stopped and a large output torque is required (for example, at the time of stationary steering), the electric motor may be controlled in accordance with the low speed/high torque characteristic.

In the above aspect, the electric motor may be formed so that the coil having a low speed/high torque characteristic is wound around each of the teeth of the stator and the coil having a high speed/low torque characteristic is wound around each of the teeth of the stator between the rotor of the electric motor and the coil having a low speed/high torque characteristic.

With the above configuration, the coil having a low speed/high torque characteristic is wound at portions of the teeth at the side away from the rotor, having a high stiffness, so, even when a large output torque is generated by the motor coil in accordance with the low speed/high torque characteristic, noise and vibrations generated from the motor may be suppressed.

In the above aspect, when only one of the coils of the electric motor is being energized, the control unit corresponding to the other one of the coils of the electric motor may open three phases of the other one of the coils of the electric motor.

With the above configuration, no regenerative current flows through the motor coil of which the three phases are open, so regenerative brake does not work and a deterioration in steering feeling due to regenerative brake may be prevented.

Another aspect of the invention relates to an electric power steering. The electric power steering includes: a steering force assisting device that applies assist force to a steering system and that has an electric motor that generates the assist force; a motor driving circuit that drives the electric motor; and a control unit that controls the motor driving circuit, wherein the electric motor includes a rotor having a magnet and a stator having teeth around each of which a coil is wound, the steering force assisting device includes at least two independent sets of the electric motor, the motor driving circuit and the control unit, the at least two electric motors respectively have coils having the same polarity and different motor characteristics on the stators, the number of the coils being equal to the number of the sets of electric motor, motor driving circuit and control unit, and the at least two electric motors have the common rotor.

According to the above aspect of the invention, it is possible to provide an electric power steering that maintains the reliability of a system and that gives an appropriate steering feeling based on the running condition of a vehicle.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 4 is a block diagram that shows the electrical configuration of the EPS;

FIG. 5 is a configuration diagram of power line open-close portions;

DETAILED DESCRIPTION OF EMBODIMENTS

Figure 1:
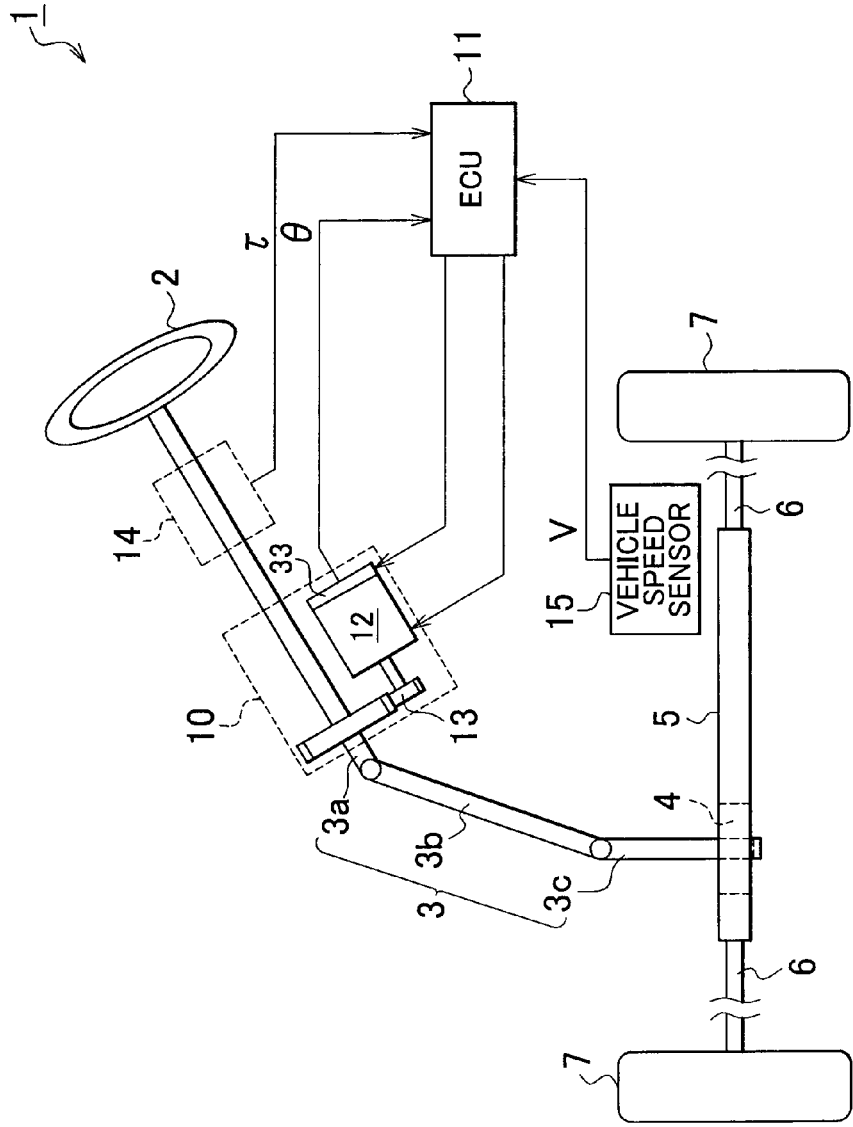
FIG. 1 is a schematic configuration diagram of an electric power steering (EPS)

Hereinafter, a columnar type electric power steering (hereinafter, referred to as EPS) according to a specific embodiment of the invention will be described with reference to the accompanying drawings. As shown in FIG. 1, in the EPS 1 according to the present embodiment, a steering shaft 3 is coupled to a rack shaft 5 via a rack-and-pinion mechanism 4. A steering wheel 2 is fixed to the steering shaft 3. Then, the rotation of the steering shaft 3 resulting from steering operation is converted to reciprocating linear motion of the rack shaft 5 by the rack-and-pinion mechanism 4. Note that the steering shaft 3 according to the present embodiment is formed by coupling a column shaft 3a, an intermediate shaft 3b and a pinion shaft 3c. Then, the reciprocating linear motion of the rack shaft 5 resulting from the rotation of the steering shaft 3 is transmitted to knuckles (not shown) via tie rods 6 coupled to both ends of the rack shaft 5 to thereby vary the turning angle of steered wheels 7.

In addition, the EPS 1 includes an EPS actuator 10 and an ECU 11. The EPS actuator 10 serves as a steering force assisting device and applies assist force for assisting in steering operation to a steering system. The ECU 11 controls operation of the EPS actuator 10.

The EPS actuator 10 according to the present embodiment is a columnar type EPS actuator. A motor 12 that is the driving source of the EPS actuator 10 is drivably coupled to the column shaft 3a via a reduction mechanism 13. The EPS actuator 10 uses the reduction mechanism 13 to reduce the speed of rotation of the motor 12 and transmits the rotation to the column shaft 3a. By so doing, the EPS actuator 10 applies the motor torque to the steering system as assist force.

A torque sensor 14, a vehicle speed sensor 15 and a motor rotation angle sensor 33 are connected to the ECU 11. The ECU 11 detects a steering torque $\tau$, a vehicle speed V and a motor rotation angle $\theta$ on the basis of the signals output from these sensors. For example, the torque sensor 14 according to the present embodiment is a twin resolver type torque sensor in which a pair of resolvers are provided at both ends of a torsion bar spring (not shown). In addition, the ECU 11 computes a target assist force on the basis of these detected state quantities, and controls the operation of the EPS actuator 10, that is, the assist force applied to the steering system, by supplying driving electric power to the motor 12.

Figure 2:
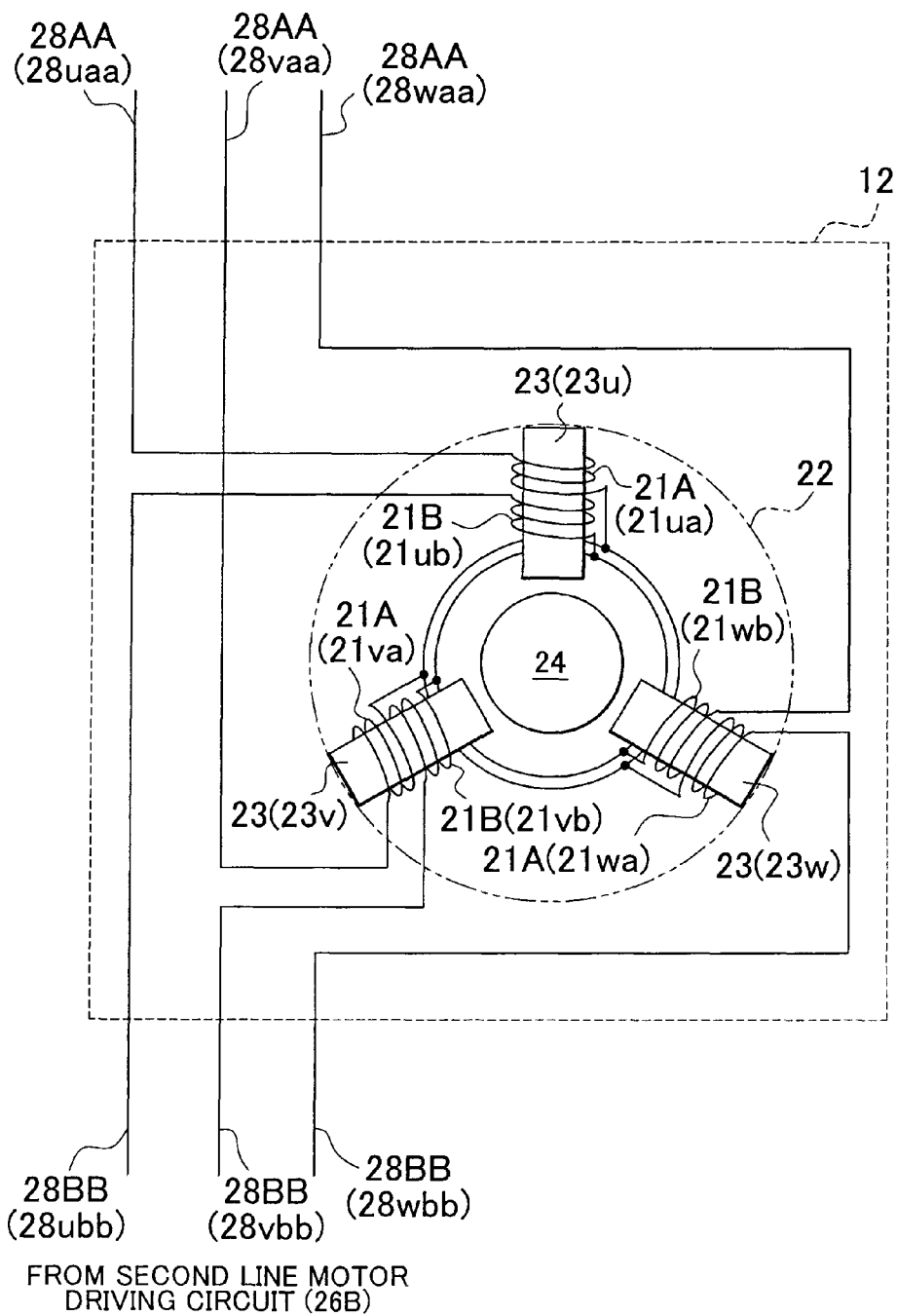
FIG. 2 is a schematic configuration diagram of a motor.

Next, the electrical configuration (motor, power system) of the EPS 1 according to the present embodiment will be described. As shown in FIG. 2, the motor 12 according to the present embodiment is formed so that first line motor coils 21A and second line motor coils 21B that are independent two lines are wound around a common stator 22. Specifically, the first line motor coils 21A (21ua, 21va and 21wa) and the second line motor coils 21B (21ub, 21vb and 21wb) are respectively wound around teeth 23 (23u, 23v and 23w) of the corresponding phases (U, V and W) of the stator 22. Then, a rotor 24 is provided radially inside these teeth 23 (23u, 23v and 23w). The rotor 24 is rotatably supported.

That is, the motor 12 according to the present embodiment includes the stator 22 and the rotor 24 that are common to the two lines, that is, the first line motor coils 21A and the second line motor coils 21B. The rotor 24 rotates on the basis of magnetomotive force generated by the first line motor coils 21A or the second line motor coils 21B that are wound around the teeth 23 (23u, 23v and 23w) as described above. Then, the ECU 11 according to the present embodiment is configured to supply driving electric power to these first line motor coils 21A and second line motor coils 21B independently of each other to thereby control the motor torque.

The first line motor coils 21A and a control signal output unit 31 (described later) provide a first line system characteristic shown in FIG. 3A. The first line system characteristic is of a low speed/high torque mode as shown in the graph where the abscissa axis represents motor torque and the ordinate axis represents the number of revolutions of the motor. By so doing, the motor 12 may be caused to function in a low speed/high torque mode. In addition, the second line motor coils 21B and the control signal output unit 31 (described later) provide a second line system characteristic shown in FIG. 3B. Similarly, the second line system characteristic is a high speed/low torque mode where the abscissa axis represents motor torque and the ordinate axis represents the number of revolutions of the motor. By so doing, the motor 12 may be caused to function in a high speed/low torque mode.

Note that the correlation between the first line system characteristic and the second line system characteristic may be expressed by T1≥T2 and N1≥N2 where the maximum output torque is T1 and the maximum number of revolutions of the motor is N1 in the first line system characteristic, and the maximum output torque is T2 and the maximum number of revolutions of the motor is N2 in the second line system characteristic. Then, the first line system characteristic is effective when large output torque is required while the vehicle speed is low or the vehicle is stopped (for example, stationary steering); whereas the second line system characteristic is effective when a large number of revolutions of the motor is required (for example, emergency steering) while the vehicle speed is medium or high.

In addition, as shown in FIG. 2, the first line motor coils 21A that output high torque each are wound on a side of each of the teeth 23 (23u, 23v and 23w) away from the rotor 24. This is because the stiffness of each of the teeth 23 (23u, 23v and 23w) is higher at the side away from the rotor 24 than at a side adjacent to the rotor 24 and, therefore, the vibrations of the teeth may be suppressed even when the first line motor coils 21A generate large output torque, and noise and vibrations generated by the motor may also be suppressed.

Note that thick motor coils are required to generate large output torque, and the first line motor coils 21A each are wound around a corresponding one of the teeth 23 (23u, 23v and 23w) at the side away from the rotor 24, so workability at the time of assembling may also be improved.

Next, as shown in FIG. 4, the ECU 11 according to the present embodiment includes a first line motor driving circuit 26A and a second line motor driving circuit 26B. The first line motor driving circuit 26A is provided independently in correspondence with the first line motor coils 21A. The second line motor driving circuit 26B is provided independently in correspondence with the second line motor coils 21B. In addition, the ECU 11 further includes a first pre-drive circuit 47. The first pre-drive circuit 47 independently outputs a first line control signal Smc_a and a second line control signal Smc_b respectively to these first line motor driving circuit 26A and second line motor driving circuit 26B.

More specifically, the first line motor driving circuit 26A is connected to the first line motor coils 21A via first line power lines 28A (28ua, 28va and 28wa), first line power line open-close units (40, 41 and 42) and first line power lines 28AA (28uaa, 28vaa and 28waa). In addition, the second line motor driving circuit 26B is connected to the second line motor coils 21B via second line power lines 28B (28ub, 28vb and 28wb), second line power line open-close units (43, 44 and 45) and second line power lines 28BB (28ubb, 28vbb and 28wbb).

Next, the first line power line open-close units (40, 41 and 42) and the second line power line open-close units (43, 44 and 45) will be described. The first line power line open-close units (40, 41 and 42) are respectively connected to the three phases of the first line power lines 28A (28ua, 28va and 28wa). In addition, the second line power line open-close units (43, 44 and 45) are respectively connected to the three phases of the second line power lines 28B (28ub, 28vb and 28wb).

More specifically, as shown in FIG. 5, the first line power line open-close unit 40 is formed of two serially connected MOS-FETs that are semiconductor switching elements. Where one of the MOS-FETs is a first switch SW1 and the other one of the MOS-FETs is a second switch SW2, the source and drain of each of the first switch SW1 and the second switch SW2 are connected in series with the first line power line 28A (28ua), and the first line power line open-close output signal PWM2_a of a second pre-drive circuit 48 (see FIG. 4) is connected to the gate of the first switch SW1 and the gate of the second switch SW2. Then, the other first line power line open-close units 41 and 42 are also formed similarly.

In addition, the first switch SW1 and the second switch SW2 are connected in series with each other so that the orientations of the respective parasitic diodes are opposite. Therefore, even when the first switch SW1 and the second switch SW2 are open, it is possible to prevent current from flowing into the motor 12 and current from flowing out from the motor 12.

Next, as shown in FIG. 5, as in the case of the first line power line open-close unit 40, the second line power line open-close unit 43 is formed of two serially connected MOS-FETs that are semiconductor switching elements. Where one of the MOS-FETs is a first switch SW1 and the other one of the MOS-FETs is a second switch SW2, the source and drain of each of the first switch SW1 and the second switch SW2 are connected in series with the second line power line 28B (28ub), and the second line power line open-close output signal PWM2_b of the second pre-drive circuit 48 (see FIG. 4) is connected to the gate of the first switch SW1 and the gate of the second switch SW2. Then, the other second line power line open-close units 44 and 45 are also formed similarly.

The CPU 27 outputs the first line power line open-close output signal PWM2_a to the gates of the first switch SW1 and second switch SW2 of the first line power line open-close units 40, 41 and 42 via the second pre-drive circuit 48, and outputs the second line power line open-close output signal PWM2_b to the gates of the first switch SW1 and second switch SW2 of the second line power line open-close units 43, 44 and 45 via the second pre-drive circuit 48. The first switch SW1 and the second switch SW2 each are turned on (the source and the drain are conductive) during an on signal period of the first line power line open-close output signal PWM2_a or the second line power line open-close output signal PWM2_b, and each are turned off (the source and the drain are interrupted) during an off signal period.

Figure 3A:
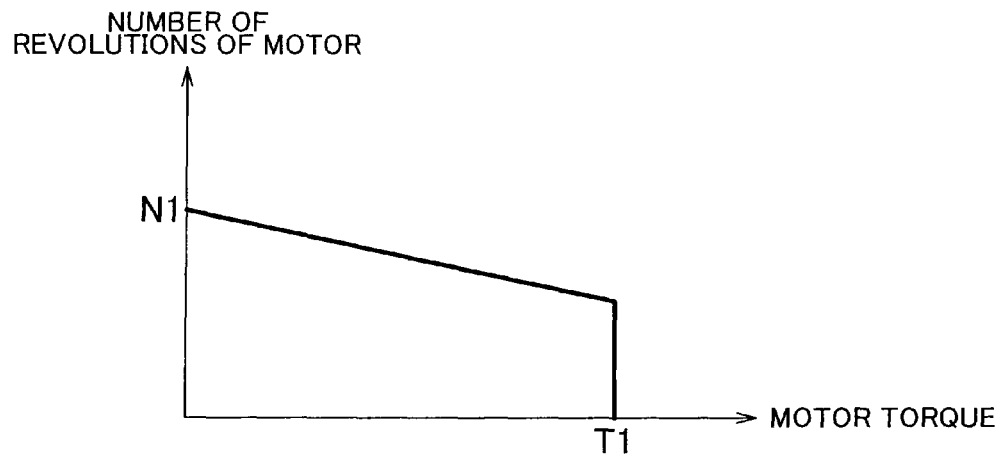
FIG. 3A and FIG. 3B are graphs that respectively show system characteristics.

In the present embodiment, when the first line system characteristic (low speed/high torque mode) shown in FIG. 3A is provided, all the first line power line open-close units (40, 41 and 42) are subjected to on/off control, and all the second line power line open-close units (43, 44 and 45) are subjected to off control. By so doing, no regenerative current flows through the second line motor coils 21B of which the three phases are open, so regenerative brake does not work and a deterioration in steering feeling due to regenerative brake may be prevented.

Figure 3B:
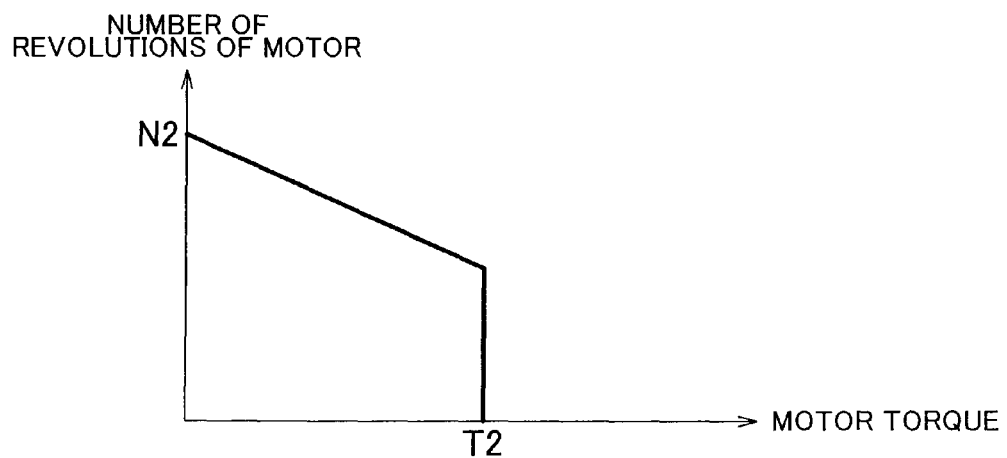

In addition, when the second line system characteristic (high speed/low torque mode) shown in FIG. 3B is provided, all the second line power line open-close units (43, 44 and 45) are subjected to on/off control, and all the first line power line open-close units (40, 41 and 42) are subjected to off control. By so doing, no regenerative current flows through the first line motor coils 21A of which the three phases are open, so regenerative brake does not work and a deterioration in steering feeling due to regenerative brake may be prevented.

Note that, in the present embodiment, a known PWM inverter is formed so that a pair of serially connected switching elements are used as a base unit (arm) and then three arms corresponding to the respective phases are connected in parallel with one another, and is employed for each of the first line motor driving circuit 26A and the second line motor driving circuit 26B, and the first line control signal Smc_a and the second line control signal Smc_b output from the CPU 27 via the first pre-drive circuit 47 prescribe the on duty ratio of each of the arms of the respective phases.

Then, the ECU 11 according to the present embodiment is configured to supply driving electric powers, output from the first line motor driving circuit 26A and the second line motor driving circuit 26B on the basis of these first line control signal Smc_a and the second line control signal Smc_b, respectively to the corresponding first line motor coils 21A and the second line motor coils 21B independently of each other.

Figure 6:
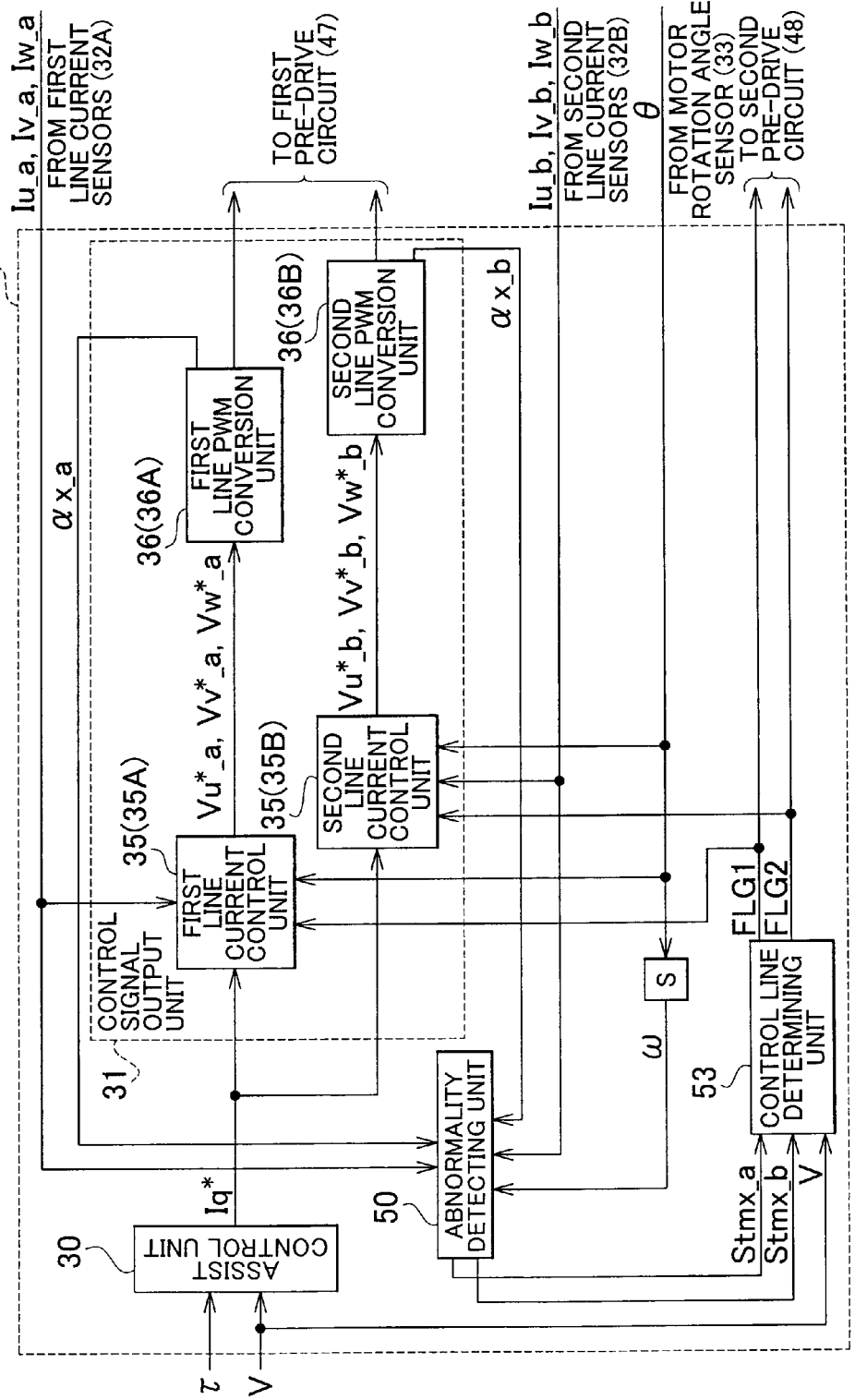
FIG. 6 is a block diagram that shows the functional configuration of a CPU.

Next, the electrical (control system) configuration of the EPS 1 according to the present embodiment will be described. As shown in FIG. 6, the CPU 27 according to the present embodiment includes an assist control unit 30 and the control signal output unit 31. The assist control unit 30 generates a basic command Iq* for supplying electric power to the motor 12 in order to generate a motor torque corresponding to a target assist force. The control signal output unit 31 outputs the two line signals, that is, the first line control signal Smc_a and the second line control signal Smc_b, via the first pre-drive circuit 47.

Furthermore, as shown in FIG. 6, the CPU 27 includes an abnormality detecting unit 50. When there occurs an abnormality in the EPS 1, the abnormality detecting unit 50 is used to determine the mode of the abnormality.

Then, the CPU 27 includes a control line determining unit 53. The control line determining unit 53 determines whether the first line system characteristic or the second line system characteristic is used on the basis of first line X phase (X=U, V and W) normal/abnormal energization determination status flags Stmx_a (described later), second line X phase (X=U, V and W) normal/abnormal energization determination status flags Stmx_b (described later) and the vehicle speed V. The first line X phase (X=U, V and W) normal/abnormal energization determination status flags Stmx_a and the second line X phase (X=U, V and W) normal/abnormal energization determination status flags Stmx_b are output from the abnormality detecting unit 50.

More specifically, in the present embodiment, the assist control unit 30 that serves as a command unit computes a current command value corresponding to the target assist force on the basis of the steering torque τ detected by the torque sensor 14 and the vehicle speed V detected by the vehicle speed sensor 15. Specifically, a current command value is computed so as to generate a larger assist force as the steering torque increases or as the vehicle speed V decreases. Then, the assist control unit 30 outputs the current command value based on the steering torque τ and the vehicle speed V to the control signal output unit 31 as the basic command Iq* for supplying electric power to the motor 12.

On the other hand, first line phase current values Iu_a, Iv_a and Iw_a that are passed through the first line power lines 28A, second line phase current values Iu_b, Iv_b and Iw_b that are passed through the second line power lines 28B, the rotation angle θ of the motor 12 and a first line system status flag FLG1 (described later) and a second line system status flag FLG2 (described later) that are output from the control line determining unit 53 are input to the control signal output unit 31.

Note that the first line phase current values Iu_a, Iv_a and Iw_a and the second line phase current values Iu_b, Iv_b and Iw_b are respectively detected by first line current sensors 32A (32$ua$, 32$va$ and 32$wa$) and second line current sensors 32B (32$ub$, 32$vb$ and 32$wb$); whereas the rotation angle θ of the motor 12 is detected by a common rotation angle sensor 33. The first line current sensors 32A (32$ua$, 32$va$ and 32$wa$) are provided in the first line power lines 28A, and the second line current sensors 32B (32$ub$, 32$vb$ and 32$wb$) are provided in the second line power lines 28B.

Then, the control signal output unit 31 executes current feedback control on the basis of these state quantities and the basic command Iq* output from the assist control unit 30 to thereby output the first line control signal Smc_a corresponding to the first line motor driving circuit 26A and the second line control signal Smc_b corresponding to the second line motor driving circuit 26B via the first pre-drive circuit 47.

More specifically, the control signal output unit 31 includes a first line current control unit 35A, a first line PWM conversion unit 36A, a second line current control unit 35B and a second line PWM conversion unit 36B. The first line current control unit 35A and the first line PWM conversion unit 36A are in correspondence with the first line motor driving circuit 26A, the first line motor coils 21A and the first line power lines 28A. The second line current control unit 35B and the second line PWM conversion unit 36B are in correspondence with the second line motor driving circuit 26B, the second line motor coils 21B and the second line power lines 28B.

In addition, the control signal output unit 31 inputs the basic command Iq* input from the assist control unit 30 to the first line current control unit 35A and the second line current control unit 35B. Then, the first line phase current values Iu_a, Iv_a and Iw_a, the rotation angle θ of the motor 12 and the first line system status flag FLG1 output from the control line determining unit 53 are input to the first line current control unit 35A, and the second line phase current values Iu_b, Iv_b and Iw_b, the rotation angle θ of the motor 12 and the second line system status flag FLG2 output from the control line determining unit 53 are input to the second line current control unit 35B. Then, the first line current control unit 35A and the second line current control unit 35B each independently execute current feedback control on the basis of the input state quantities.

Specifically, when the first line system status flag FLG1 input from the control line determining unit 53 is "1" (execute assist control), the first line current control unit 35A converts the corresponding first line phase current values Iu_a, Iv_a and Iw_a to a d-axis current value Id and a q-axis current value Iq according to the rotation angle θ of the motor 12 (d/q conversion). When the second line system status flag FLG2 input from the control line determining unit 53 is "1" (execute assist control), the second line current control unit 35B converts the corresponding second line phase current values Iu_b, Iv_b and Iw_b to a d-axis current value Id and a q-axis current value Iq according to the rotation angle θ of the motor 12 (d/q conversion).

In addition, the q-axis current command value Iq* is input as a q-axis current command value (the d-axis current command value is "0"). Then, the first line current control unit 35A maps the d-axis voltage command value and the q-axis voltage command value obtained by executing current feedback control on the d/q coordinate system onto three-phase alternating-current coordinates (d/q inversion) to compute first line phase voltage command values Vu*_a, Vv_a* and Vw_a*. The second line current control unit 35B maps the d-axis voltage command value and the q-axis voltage command value obtained by executing current feedback control on the d/q coordinate system onto three-phase alternating-current coordinates (d/q inversion) to compute second line phase voltage command values Vu_b*, Vv_b* and Vw_b*.

Then, the first line PWM conversion unit 36A is configured to output the first line control signal Smc_a to the first line motor driving circuit 26A via the first pre-drive circuit 47 on the basis of the first line phase voltage command values Vu*_a, Vv_a* and Vw_a* input from the first line current control unit 35A, and the second line PWM conversion unit 36B is configured to output the second line control signal Smc_b to the second line motor driving circuit 26B via the first pre-drive circuit 47 on the basis of the second line phase voltage command values Vu_b*, Vv_b* and Vw_b* input from the second line current control unit 35B. However, when at least any one of the first line system status flag FLG1 and the second line system status flag FLG2 is "0", the assist control is not executed.

Next, the configuration of the abnormality detecting unit 50 will be described in detail with reference to FIG. 7 to FIG. 10. First, the first line phase current values Iu_a, Iv_a and Iw_a, second line phase current values Iu_b, Iv_b and Iw_b and rotation angular velocity ω of the motor 12, a first line duty command value αx_a, a second line duty command value αx_b, and the like, are input to the abnormality detecting unit 50.

Then, the abnormality detecting unit 50, for example, detects an abnormality in the electric power supply system to the motor 12, specifically, occurrence of overcurrent or occurrence of a poor-energization phase due to a break in the corresponding power line (including the motor coil), a poor contact of the motor driving circuit, or the like, on the basis of these state quantities.

Figure 7:
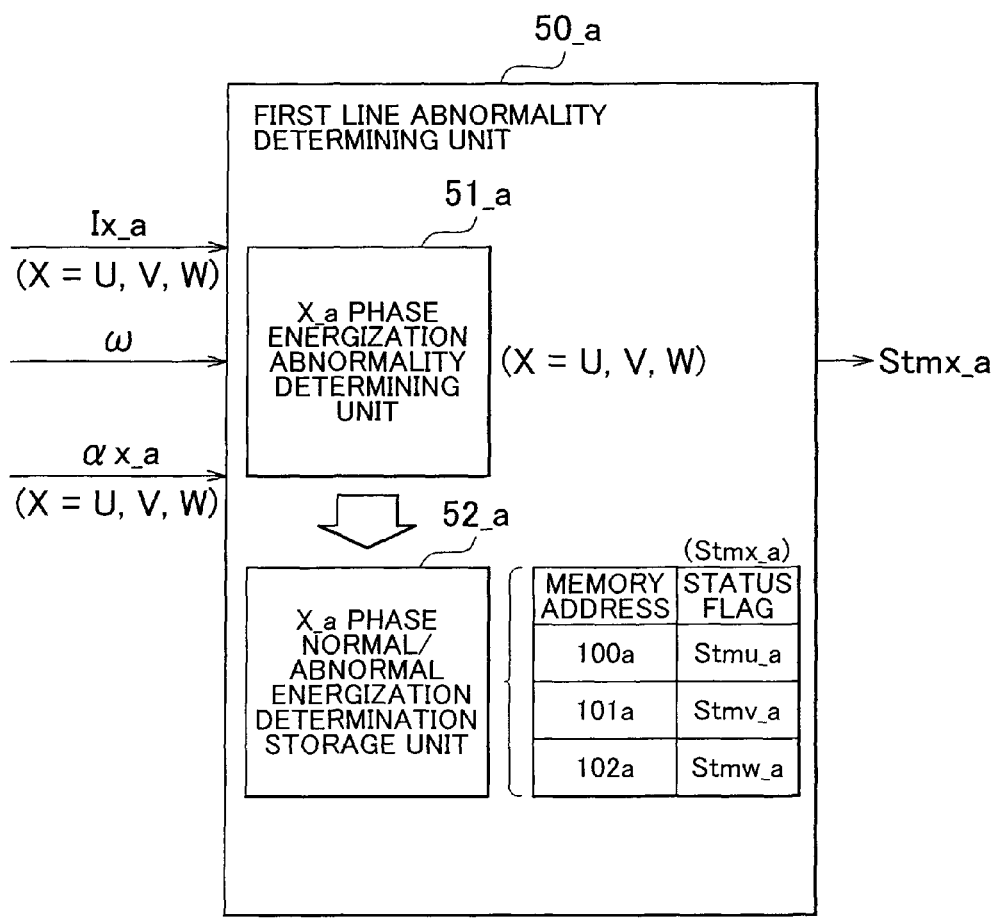
FIG. 7 is a configuration diagram of a first line system abnormality determining unit.
Figure 8:
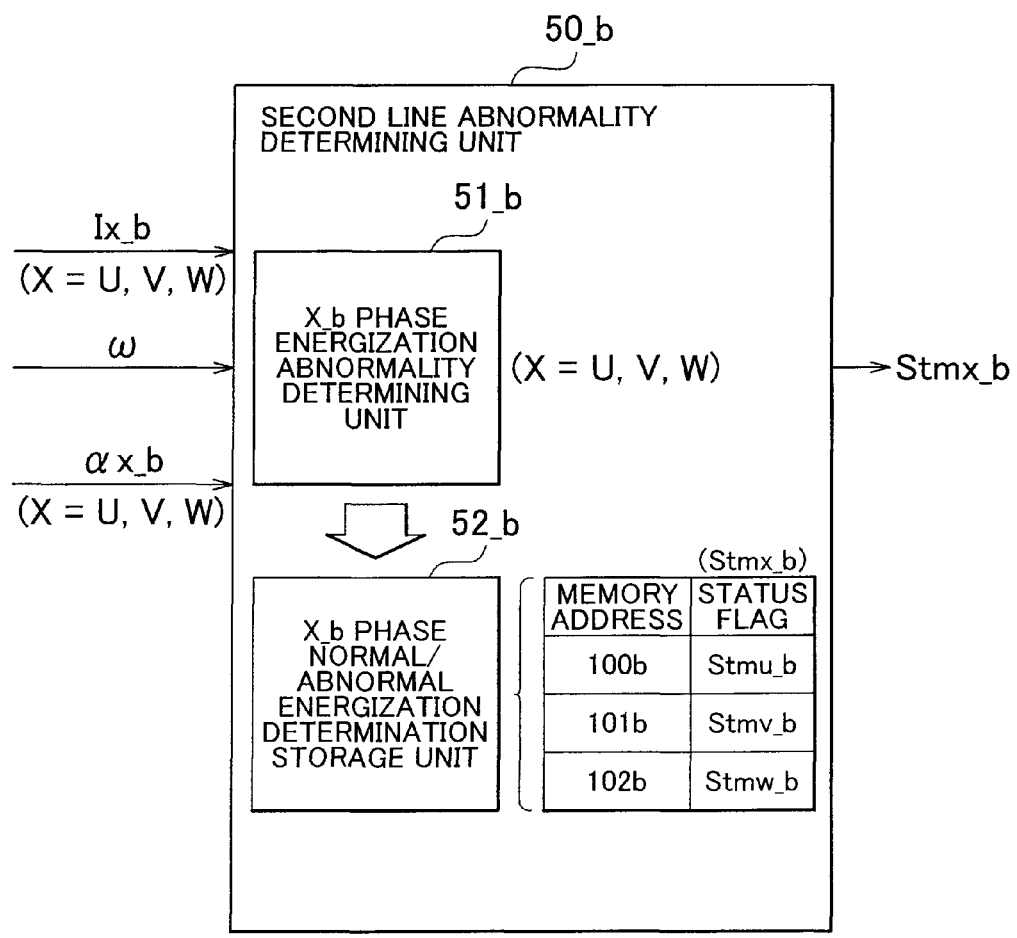
FIG. 8 is a configuration diagram of a second line system abnormality determining unit.

The abnormality detecting unit 50 is formed of a first line abnormality determining unit 50_a shown in FIG. 7 and a second line abnormality determining unit 50_b shown in FIG. 8. The first line abnormality determining unit 50_a is formed of an X_a phase energization abnormality determining unit 50_a and an X_a phase normal/abnormal energization determination storage unit 52_a. The X_a phase energization abnormality determining unit 51_a determines whether there is an energization abnormality in the X_a phase (X=U, V or W) of the first line. The X_a phase normal/abnormal energization determination storage unit 52_a stores an X_a phase normal/abnormal energization determination result determined by the X_a phase energization abnormality determining unit 51_a.

For example, in the X_a phase normal/abnormal energization determination storage unit 52_a, the details of a first line U-phase normal/abnormal energization determination status flag Stmu_a are stored at a memory address of 100a (when the status flag Stmu_a is "0", it indicates that the first line U-phase energization is normal; when the status flag Stmu_a is "1", it indicates that the first line U-phase energization is abnormal).

Similarly, the details of a first line V-phase normal/abnormal energization determination status flag Stmv_a are stored at a memory address of 101a, and the details of a first line W-phase normal/abnormal energization determination status flag Stmw_a are stored at a memory address of 102a. Then, the statuses of Stmx_a stored in the X_a phase normal/abnormal energization determination storage unit 52_a are output to the control line determining unit 53.

Furthermore, the second line abnormality determining unit 50_b is formed of an X_b phase energization abnormality determining unit 51_b and an X_b phase normal/abnormal energization determination storage unit 52_b. The X_b phase energization abnormality determining unit 51_b determines whether there is an energization abnormality in the X_b phase (X=U, V or W) of the second line. The X_b phase normal/abnormal energization determination storage unit 52_b stores an X_b phase normal/abnormal energization determination result determined by the X_b phase energization abnormality determining unit 51_b.

Then, in the X_b phase normal/abnormal energization determination storage unit 52_b, the details of a second line U-phase normal/abnormal energization determination status flag Stmu_b are stored at a memory address of 100b (when the status flag Stmu_b is "0", it indicates that the second line U-phase energization is normal; when the status flag Stmu_b is "1", it indicates that the second line U-phase energization is abnormal).

Similarly, the details of a second line V-phase normal/abnormal energization determination status flag Stmv_b are stored at a memory address of 101b, and the details of a second line W-phase normal/abnormal energization determination status flag Stmw_b are stored at a memory address of 102b. Then, the statuses of Stmx_b stored in the X_b phase normal/abnormal energization determination storage unit 52_b are output to the control line determining unit 53.

Next, an X_a poor energization determining method executed by the X_a phase energization abnormality determining unit 51_a of the first line abnormality determining unit 50_a will be described with reference to FIG. 9. For example, occurrence of a poor-energization phase is detected on the basis of whether, when the phase current value Ix_a of the X_a phase is smaller than or equal to a predetermined current value Ith ($|Ix\_a| \leq Ith$) and the rotation angular velocity ω falls within a break determination target range ($|\omega| \leq \omega 0$), the duty command value αx_a corresponding to the phase continuously falls outside the predetermined current value Ith and a predetermined range ($\alpha LO \leq \alpha x\_a \leq \alpha HI$) corresponding to a predetermined rotation angular velocity ω0 that defines the determination target range.

Note that, in this case, the predetermined current value Ith that is the threshold of the X_a phase current value Ix_a is set to a value near "0", and the predetermined rotation angular velocity ω0 that is the threshold of the rotation angular velocity ω is set to a value corresponding to the base speed (maximum number of revolutions) of the motor. Then, the duty thresholds (αLO and αHI) for the duty command value αx_a are respectively set to a value smaller than a lower limit value that the duty command value αx_a can be reached in normal control and a value larger than a high limit value that the duty command value αx_a can be reached in normal control That is, as shown in the flowchart shown in FIG. 9, the X_a phase energization abnormality determining unit 51_a determines whether the detected X_a phase current value Ix_a (absolute value) is smaller than or equal to the predetermined current value Ith (step 101), and, when the detected X_a phase current value Ix_a (absolute value) is smaller than or equal to the predetermined current value Ith ($|Ix\_a| \leq Ith$, YES in step 101), subsequently determines whether the rotation angular velocity ω (absolute value) is lower than or equal to the predetermined rotation angular velocity ω0 (step 102).

Then, when the rotation angular velocity ω is lower than or equal to the predetermined rotation angular velocity ω0 ($|\omega| \leq \omega 0$, step 102), it is determined whether the duty command value αx_a falls within the predetermined range ($\alpha LO \leq \alpha x\_a \leq \alpha HI$) (step 103), and, when the duty command value αx_a falls outside the predetermined range (NO in step 103), it is determined that there is poor energization in the X phase, and then "1" is written in the X_a phase normal/abnormal energization determination storage unit 52_a (X_a phase poor energization, Stmx_a=1, step 104).

Then, when the phase current value Ix_a is larger than the predetermined current value Ith ($|Ix\_a| > Ith$, NO in step 101), when the rotation angular velocity ω is higher than the predetermined rotation angular velocity ω0 ($|\omega| > \omega 0$, NO in step 102) or when the duty command value αx_a falls within the predetermined range ($\alpha LO \leq \alpha x\_a \leq \alpha HI$, YES in step 103), the X_a phase energization abnormality determining unit 51_a determines that the X_a phase is normal, and writes "0" in the X_a phase normal/abnormal energization determination storage unit 52_a (X_a phase is normal, Stmx_a=0, step 105).

That is, when there is poor energization (break in line) in the X_a phase (any one of the U, V and W phases), the X_a phase current value Ix_a of the corresponding phase is "0". Here, when the phase current value Ix_a of the X_a phase is "0" or a "value close to 0", the following two cases are possible other than such occurrence of a break in line.

That is, there may be the case where the rotation angular velocity ω of the motor has reached the base speed (maximum number of revolutions) and the case where the current command itself is substantially "0".

In consideration of these points, in the present embodiment, first, the phase current value Ix_a of the X_a phase to be determined is compared with the predetermined current value Ith to thereby determine whether the phase current value Ix_a is "0". Then, it is determined whether to apply to the above two cases in which the phase current value Ix_a is "0" or a "value close to 0", other than a break in line. When it does not apply to the above two cases, it is determined that there is a brake in line in the X_a phase.

That is, when an extreme duty command value αx_a is output although the rotation angular velocity ω (base speed) is not so low that the phase current value Ix_a is lower than or equal to the predetermined current value Ith close to "0", it may be determined that there is poor energization in the X_a phase. Then, in the present embodiment, the first line abnormality determining unit 50_a executes the above determination for each of the X_a phases to determine a poor-energization phase.

Figure 9:
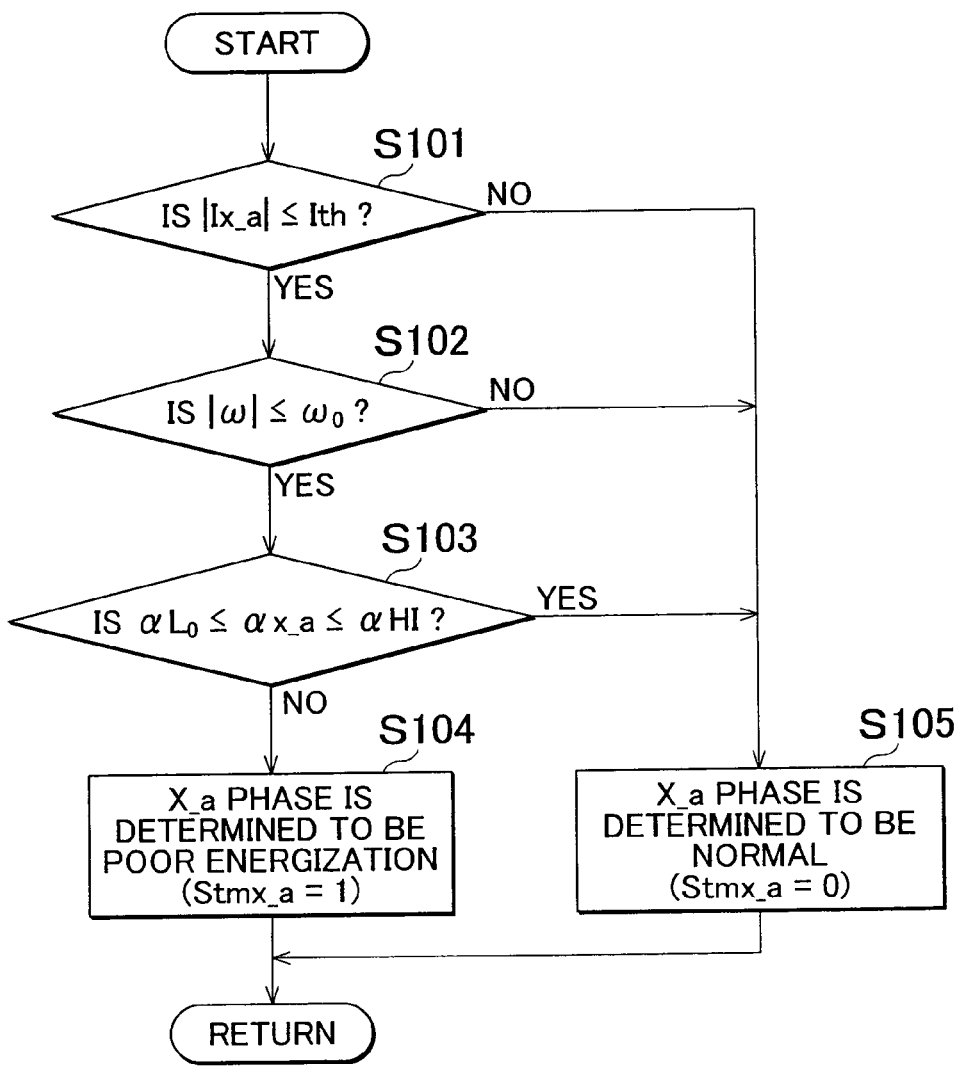
FIG. 9 is a flowchart that shows the procedure of detecting a poor-energization phase of a first line system.

Although it is omitted from the flowchart shown in FIG. 9 for the sake of convenience of description, the above determination is executed on the condition that the power supply voltage is higher than or equal to a prescribed voltage required to drive the motor 12. Then, final determination as to abnormality detection is performed on the basis of whether the state where it is determined in predetermined step 104 that there is poor energization continues for a predetermined period of time or longer.

Next, an X_b poor energization determining method executed by the X_b phase energization abnormality determining unit 51b of the second line abnormality determining unit 50_b will be described with reference to FIG. 10. For example, occurrence of a poor-energization phase is detected on the basis of whether, when the phase current value Ix_b of the X_b phase is smaller than or equal to a predetermined current value Ith ($|Ix\_b| \leq Ith$) and the rotation angular velocity ω falls within a break determination target range ($|\omega| \leq \omega 0$), the duty command value αx_b corresponding to the phase continuously falls outside the predetermined current value Ith and a predetermined range ($\alpha LO \leq \alpha x\_b \leq \alpha HI$) corresponding to a predetermined rotation angular velocity ω0 that defines the determination target range.

Note that, in this case, the predetermined current value Ith that is the threshold of the X_b phase current value Ix_b is set to a value near "0", and the predetermined rotation angular velocity ω0 that is the threshold of the rotation angular velocity ω is set to a value corresponding to the base speed (maximum number of revolutions) of the motor. Then, the duty thresholds (αLO and αHI) for the duty command value αx_b are respectively set to a value smaller than a lower limit value that the duty command value αx_b can be reached in normal control and a value larger than a high limit value that the duty command value αx_b can be reached in normal control That is, as shown in the flowchart shown in FIG. 10, the X_b phase energization abnormality determining unit 51_b determines whether the detected X_b phase current value Ix_b (absolute value) is smaller than or equal to the predetermined current value Ith (step 201), and, when the detected X_b phase current value Ix_b (absolute value) is smaller than or equal to the predetermined current value Ith ($|Ix\_b| \leq Ith$, YES in step 201), subsequently determines whether the rotation angular velocity ω (absolute value) is lower than or equal to the predetermined rotation angular velocity ω0 (step 202).

Then, when the rotation angular velocity ω is lower than or equal to the predetermined rotation angular velocity ω0 ($|\omega| \leq \omega 0$, step 202), it is determined whether the duty command value αx_b falls within the predetermined range ($\alpha LO \leq \alpha x\_b \leq \alpha HI$) (step 203), and, when the duty command value αx_b falls outside the predetermined range (NO in step 203), it is determined that there is poor energization in the X phase, and then "1" is written in the X_b phase normal/abnormal energization determination storage unit 52_b (X_b phase poor energization, Stmx_b=1, step 204).

Then, when the phase current value Ix_b is larger than the predetermined current value Ith ($|Ix\_b| > Ith$, NO in step 201), when the rotation angular velocity ω is higher than the predetermined rotation angular velocity ω0 ($|\omega| > \omega 0$, NO in step 202) or when the duty command value αx_b falls within the predetermined range ($\alpha LO \leq \alpha x\_b \leq \alpha HI$, YES in step 203), the X_b phase energization abnormality determining unit 51_b determines that the X_b phase is normal, and writes "0" in the X_b phase normal/abnormal energization determination storage unit 52_b (X_b phase is normal, Stmx_b=0, step 205).

That is, when there is poor energization (break in line) in the X_b phase (any one of the U, V and W phases), the X_b phase current value Ix_b of the corresponding phase is "0". Here, when the phase current value Ix_b of the X_b phase is "0" or a "value close to 0", the following two cases are possible other than such occurrence of a break in line.

That is, there may be the case where the rotation angular velocity ω of the motor has reached the base speed (maximum number of revolutions) and the case where the current command itself is substantially "0".

In consideration of these points, in the present embodiment, first, the phase current value Ix_b of the X_b phase to be determined is compared with the predetermined current value Ith to thereby determine whether the phase current value Ix_b is "0". Then, it is determined whether to apply to the above two cases in which the phase current value Ix_b is "0" or a "value close to 0", other than a break in line. When it does not apply to the above two cases, it is determined that there is a brake in line in the X_b phase.

That is, when an extreme duty command value αx_b is output although the rotation angular velocity ω (base speed) is not so low that the phase current value Ix_b is lower than or equal to the predetermined current value Ith close to "0", it may be determined that there is poor energization in the X_b phase. Then, in the present embodiment, the second line abnormality determining unit 50_b executes the above determination for each of the X_b phases to determine a poor-energization phase.

Figure 10:
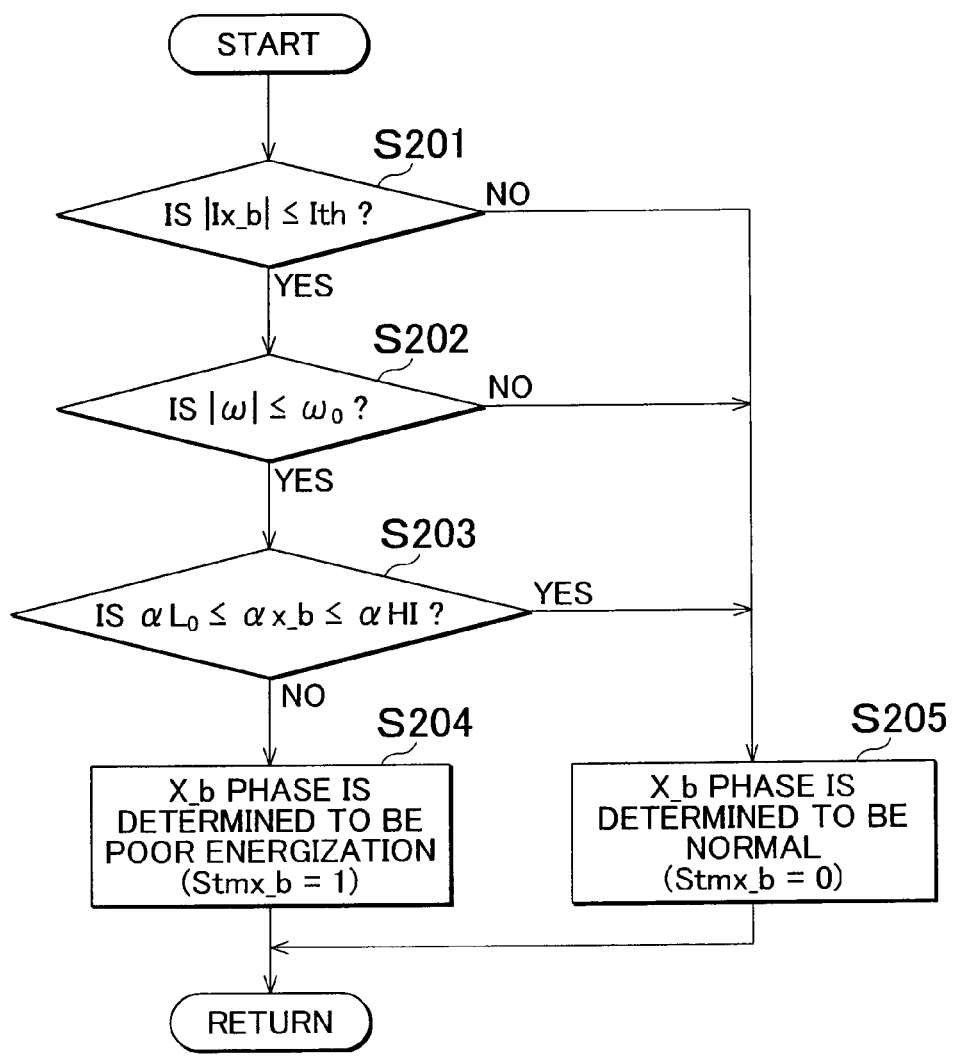
FIG. 10 is a flowchart that shows the procedure of detecting a poor-energization phase of a second line system.

Although it is omitted from the flowchart shown in FIG. 10 for the sake of convenience of description, the above determination is executed on the condition that the power supply voltage is higher than or equal to a prescribed voltage required to drive the motor 12. Then, final determination as to abnormality detection is performed on the basis of whether the state where it is determined in predetermined step 204 that there is poor energization continues for a predetermined period of time or longer.

In the present embodiment, the ECU 11 changes the control mode of the motor 12 on the basis of the results of abnormality determination made by the abnormality detecting unit 50. Specifically, the abnormality detecting unit 50 outputs the above results of abnormality determination, including poor energization detection, to the control line determining unit 53 as the first line X-phase (X=U, V and W) normal/abnormal energization determination status flags Stmx_a and the second line X-phase (X=U, V and W) normal/abnormal energization determination status flags Stmx_b.

The control line determining unit 53 changes the control mode of the motor 12 on the basis of the first line X-phase (X=U, V and W) normal/abnormal energization determination status flags Stmx_a, the second line X-phase (X=U, V and W) normal/abnormal energization determination status flags Stmx_b and the separately input vehicle speed V.

More specifically, the control mode includes a "first line system assist control mode", a "second line system assist control mode" and an "assist stop mode". In the "first line system assist control mode", assist control is performed using the first line system while the three phases of the second line motor are opened. In the "second line system assist control mode", assist control is performed using the second line system while the three phases of the first line motor are opened. In the "assist stop mode", the three phases of the first line motor and the three phases of the second line motor are opened.

Furthermore specifically, the control line determining unit 53 compares the vehicle speed V with a predetermined vehicle speed V0 when the first line X-phase (X=U, V and W) normal/abnormal energization determination status flags Stmx_a and second line X-phase (X=U, V and W) normal/abnormal energization determination status flags Stmx_b output from the abnormality detecting unit 50 are normal.

Then, when the vehicle speed V is lower than or equal to the predetermined vehicle speed V0 (low vehicle speed), the "first line system assist control mode" is set to perform assist control using the first line system and open the three phases of the second line motor. In addition, when the vehicle speed V is higher than the predetermined vehicle speed V0 (medium or high vehicle speed), the "second line system assist control mode" is set to perform assist control using the by the second line system and open the three phases of the first line motor.

Then, when any one of the first line system and the second line system is abnormal, assist control is continued by the remaining normal system; whereas, when both the systems are abnormal, the "assist stop mode" is set to open the three phases of each of the first and second line motors.

Figure 11:
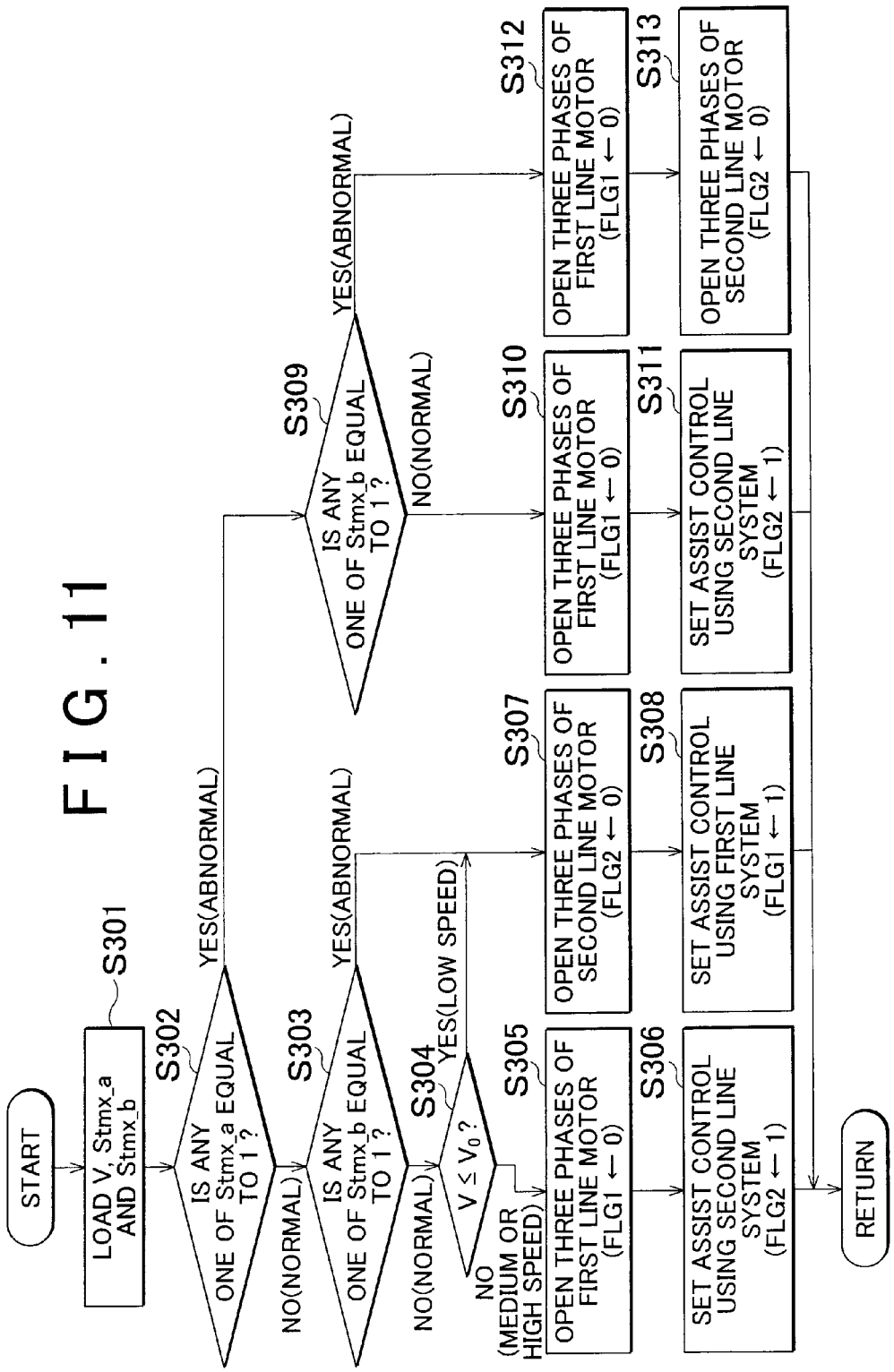
FIG. 11 is a flowchart that shows the procedure of determining a first or second line system characteristic control mode.

The process executed by the control line determining unit 53 to change among the three control modes will be described in detail with reference to the flowchart shown in FIG. 11.

The control line determining unit 53 initially loads the vehicle speed V, the first line X-phase normal/abnormal energization determination status flags Stmx_a and the second line X-phase normal/abnormal energization determination status flags Stmx_b (step 301). Subsequently, it is determined whether any one of the first line X-phase normal/abnormal energization determination status flags Stmx_a is "1" (step 302).

After that, when it is determined in step 302 that there is no poor energization in the first line X-phase (NO in step 302), it is determined whether any one of the second line X-phase normal/abnormal energization determination status flags Stmx_b is "1" (step 303). Then, when it is determined in step 303 that there is no poor energization in the second line X-phase (NO in step 303), it is determined whether the vehicle speed V is lower than or equal to the predetermined vehicle speed V0 (step 304).

Subsequently, when it is determined in step 304 that the vehicle speed V is higher than the predetermined vehicle speed V0 (NO in step 304), the three phases of the first line motor are opened (FLG1=0 in step 305) and assist control is set using the second line system (FLG2=1 in step 306), after which the process ends.

Alternatively, when it is determined in step 304 that the vehicle speed V is lower than or equal to the predetermined vehicle speed V0 (YES in step 304), the three phases of the second line motor are opened (FLG2=0 in step 307) and assist control is set using the first line system (FLG1=1 in step 308), after which the process ends.

When it is determined in step 303 that there is poor energization in the second line X-phase (YES in step 303), the three phases of the second line motor are opened (FLG2=0 in step 307) and assist control is set using the first line system (FLG1=1 in step 308), after which the process ends.

When it is determined in step 302 that there is poor energization in the first line X-phase (YES in step 302), it is determined whether any one of the second line X-phase normal/abnormal energization determination status flags Stmx_b is "1" (step 309). Subsequently, when it is determined in step 309 that there is no poor energization in the second line X-phase (NO in step 309), the three phases of the first line motor are opened (FLG1=0 in step 310) and assist control is set using the second line system (FLG2=1 in step 311), after which the process ends.

Alternatively, when it is determined in step 309 that there is poor energization in the second line X-phase (YES in step 309), the three phases of the first line motor are opened (FLG1=0 in step 312) and the three phases of the second line motor are opened (FLG2=0 in step 313), after which the process ends.

Figure 12:
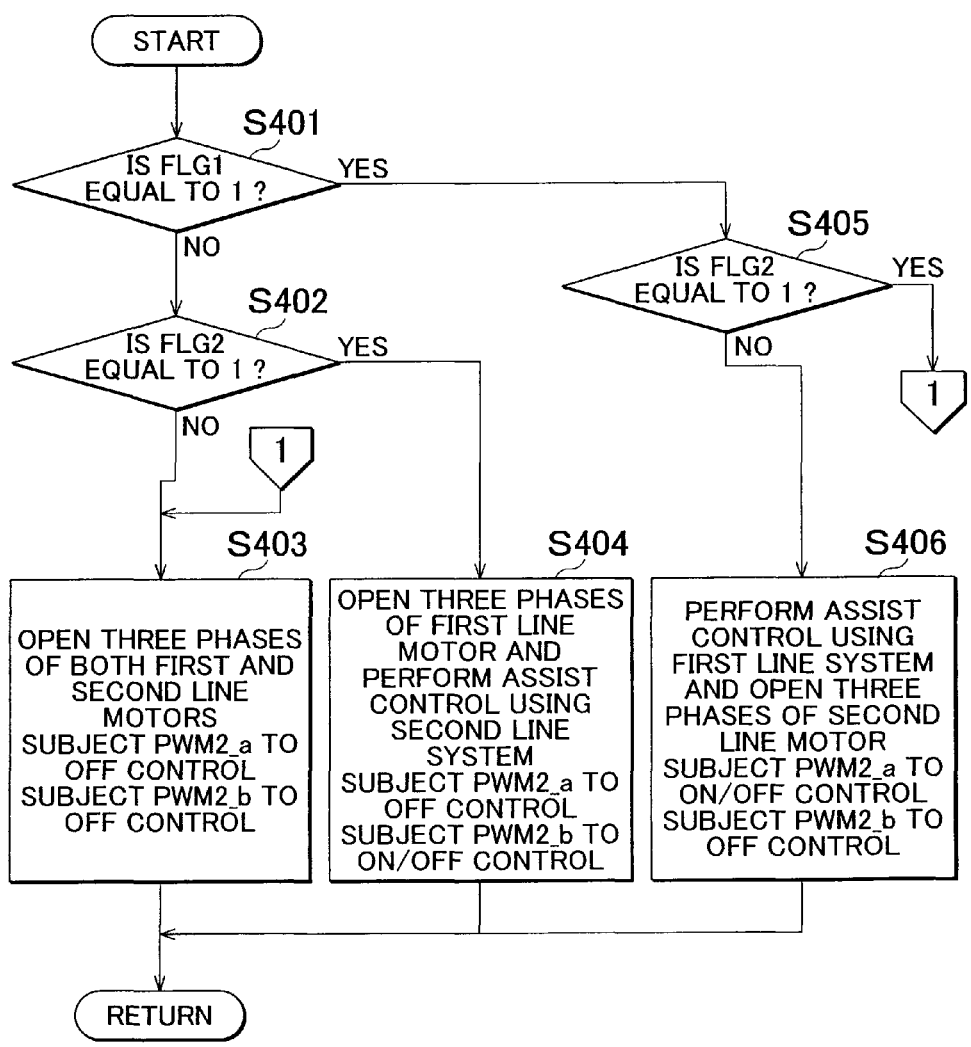
FIG. 12 is a flowchart that shows the procedure of the first and/or second line power line open-close portions.

Next, the relationship among the first line system status flag FLG1, the second line system status flag FLG2 and the first line power line open-close output signal PWM2_a and second line power line open-close output signal PWM2_b that are output from the second pre-drive circuit 48 shown in FIG. 4 will be described in detail with reference to the flowchart shown in FIG. 12.

Initially, it is determined whether the first line system status flag FLG1 is "1" (step 401). Then, when the first line system status flag FLG1 is not "1" (NO in step 401), it is determined whether the second line system status flag FLG2 is "1" (step 402). Then, when the second line system status flag FLG2 is not "1" (NO in step 402), the three phases of both the first and second line motors are opened (PWM2_a is subjected to off control and PWM2_b is subjected to off control in step 403), after which the process ends.

When the second line system status flag FLG2 is "1" (YES in step 402), the three phases of the first line motor are opened and assist control is set using the second line system (PWM2_a is subjected to off control and PWM2_b is subjected to on/off control in step 404), after which the process ends.

When the first line system status flag FLG1 is "1" (YES in step 401), it is determined whether the second line system status flag FLG2 is "1" (step 405). Then, when the second line system status flag FLG2 is not "1" (NO in step 405), assist control is set using the first line system and the three phases of the second line motor are opened (PWM2_a is subjected to on/off control and PWM2_b is subjected to off control in step 406), after which the process ends.

When the second line system status flag FLG2 is "1" (YES in step 405), the three phases of both the first and second line motors are opened (PWM2_a is subjected to off control and PWM2_b is subjected to off control in step 403), after which the process ends.

According to the present embodiment, the following functions and advantageous effects may be obtained. The steering force assisting device includes independent two sets of the motor driving circuit and the control unit, and the electric motor includes two coils having the same polarity and different motor characteristics on each of the teeth of the stator. That is, the two coils that are provided for the stator of the motor and that have the same polarity and different motor characteristics may be respectively controlled by the two independent sets of motor driving circuit and control unit, so the motor characteristics, that is, the high speed/low torque characteristic and the low speed/high torque characteristic, are selected on the basis of the running condition of the vehicle to thereby make it possible to obtain an appropriate steering feeling. In addition, the first line system and the second line system are respectively formed of the two independent sets of motor driving circuit and control unit, so the reliability of the EPS system, is not deteriorated. Furthermore, when there occurs an abnormality in any one of the first line system and the second line system, steering may be performed by the remaining normal system.

Other than the above, the motor includes two coils having the same polarity and different motor characteristics on each of the teeth of the stator, so space may be saved. In addition, when there occurs poor energization in any one of the phases of the motor due to a break in the power supply line, a contact failure of the driving circuit, or the like, steering may be continued.

Note that the present embodiment may be modified as follows. In the present embodiment, a specific embodiment of the invention is the electric power steering (EPS); instead, a specific embodiment of the invention may be a motor control device used in applications other than the EPS.

In the present embodiment, the coil having a low speed/high torque characteristic is wound around each of the teeth of the stator, and the coil having a high speed/low torque characteristic is further wound around each of the teeth of the stator between the rotor of the motor and the coil having a low speed/high torque characteristic; instead, it is also applicable that a coil having a high speed/low torque characteristic is wound around each of the teeth of the stator and a coil having a low speed/high torque characteristic is further wound around each of the teeth of the stator between the rotor of the motor and the coil having a high speed/low torque characteristic.

In the present embodiment, each of the first and second line power line open-close units is formed of the two serially connected MOS-FETs that are semiconductor switching elements. However, each of the first and second line power line open-close units may be, of course, formed of a single relay.

In the present embodiment, the steering force assisting device includes independent two sets of the motor driving circuit and the control unit; instead, of course, the steering force assisting device may include independent three or more sets of the motor driving circuit and the control unit.

The invention claimed is:

1. An electric power steering apparatus, comprising:
a steering force assisting device that applies assist force to a steering system, the steering force assisting device having an electric motor that generates the assist force;
a number of independent motor driving circuits that drive the electric motor, the number of the independent motor driving circuits being two or more; and
a control unit operably coupled with and configured to control the independent motor driving circuits, wherein
the electric motor includes a rotor having a magnet and a stator having teeth,
the electric motor includes a number of lines of coils, the number of lines of the coils being equal to the number of the independent motor driving circuits, each of the lines of the coils being respectively connected to a different one of the independent motor driving circuits, each of the coils being wound around each of the teeth of the stator,
each of the lines of the coils having a same polarity and each of the lines of the coils providing different motor characteristics on the stator when energized, and
a motor characteristic provided by a first one of the lines of the coils is a high speed/low torque characteristic and a motor characteristic provided by a second one of the lines of the coils is a low speed/high torque characteristic.

2. The electric power steering apparatus according to claim 1, wherein the electric motor is formed so that the second one of the lines of the coils having the low speed/high torque characteristic is wound around each of the teeth of the stator, and the first one of the lines of the coils having the high speed/low torque characteristic is wound around each of the teeth of the stator between the rotor of the electric motor and the second one of the lines of the coils having the low speed/high torque characteristic.

3. The electric power steering apparatus according to claim 1, wherein, when only a first one of the lines of the coils of the electric motor is being energized, the control unit corresponding to a second one of the lines of the coils of the electric motor opens three phases of the second one of the lines of the coils of the electric motor.

* * * * *